United States Patent
Hong et al.

(10) Patent No.: US 10,424,917 B2
(45) Date of Patent: Sep. 24, 2019

(54) OVERCURRENT PROTECTIVE SYSTEM AND OVERCURRENT PROTECTIVE METHOD

(71) Applicant: SAMSUNG DISPLAY CO., LTD., Yongin, Gyeonggi-do (KR)

(72) Inventors: Jun ki Hong, Yongin-si (KR); Jong Jae Lee, Yongin-si (KR); Seok Hwan Lee, Yongin-si (KR); Se Young Heo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 576 days.

(21) Appl. No.: 15/135,935

(22) Filed: Apr. 22, 2016

(65) Prior Publication Data

US 2017/0070045 A1 Mar. 9, 2017

(30) Foreign Application Priority Data

Sep. 9, 2015 (KR) .................. 10-2015-0127877

(51) Int. Cl.
*H02H 9/02* (2006.01)
(52) U.S. Cl.
CPC .................... *H02H 9/02* (2013.01)
(58) Field of Classification Search
CPC ........................................ H02H 9/02
USPC .......................................... 361/87
See application file for complete search history.

(56) References Cited

U.S. PATENT DOCUMENTS

| | | | | |
|---|---|---|---|---|
| 4,758,919 A | * | 7/1988 | Stewart | H02H 3/06 361/114 |
| 2008/0285198 A1 | * | 11/2008 | Morino | G05F 1/573 361/93.9 |
| 2014/0078629 A1 | * | 3/2014 | Cortigiani | H03K 17/0822 361/79 |
| 2014/0268458 A1 | * | 9/2014 | Luciani | H02H 1/043 361/86 |
| 2014/0300387 A1 | | 10/2014 | Zhou et al. | |
| 2015/0048812 A1 | | 2/2015 | Lin et al. | |

* cited by examiner

*Primary Examiner* — Kevin J Comber
(74) *Attorney, Agent, or Firm* — Cantor Colburn LLP (57) ABSTRACT

An overcurrent protective system includes a current detector which detects a current flowing in an element which is to be protected by the overcurrent protective system, an overcurrent counting unit which selects an overcurrent sensing level corresponding to the element among a plurality of overcurrent sensing levels which are threshold values becoming standards for determining whether the current detected by the current detector is a normal current or an overcurrent and which determines whether the current is the overcurrent or not by comparing the current with the selected overcurrent sensing level, and a controller which decreases an output voltage of a circuit which is to be protected by the overcurrent protective system and includes the element when the current flowing in the element is determined as the overcurrent.

15 Claims, 6 Drawing Sheets

OVERCURRENT PROTECTIVE SYSTEM AND OVERCURRENT PROTECTIVE METHOD

This application claims priority to Korean Patent Application No. 10-2015-0127877, filed on Sep. 9, 2015, and all the benefits accruing therefrom under 35 U.S.C. § 119, the content of which in its entirety is herein incorporated by reference.

BACKGROUND (a) Field

Exemplary embodiments of the invention relate to an overcurrent protective system and an overcurrent protective method.

(b) Description of the Related Art

In general, various types of electronic devices with various electrical functions are provided in various circuits. In a circuit, a semiconductor element such as a metal oxide silicon field effect transistor ("MOSFET") may be used as a switching element. The switching element controls a magnitude of an output voltage of the circuit by being periodically turned on or off.

In detail, when a current flowing in a specific element of the circuit becomes equal to or larger than a predetermined standard level, the output voltage of the circuit is first decreased by the switching element and an operation of the circuit is shut off when the decreased output voltage becomes equal to or lower than another standard level, whereby the circuit can be protected.

As various devices with various functions have been developed, the types of circuits and elements to be provided in the devices have been also diversified. Accordingly, an overcurrent protective method is desired to be appropriately performed depending on the type and properties of the element or circuit.

SUMMARY

The invention has been made in an effort to provide an overcurrent protective system and an overcurrent protective method.

According to an exemplary embodiment of the invention, an overcurrent protective system may include a current detector which detects a current flowing in an element which is to be protected by the overcurrent protective system, an overcurrent counting unit which selects an overcurrent sensing level corresponding to the element among a plurality of overcurrent sensing levels which are threshold values becoming standards for determining whether the current detected by the current detector is a normal current or an overcurrent and which determines whether the current is the overcurrent or not by comparing the current with the selected overcurrent sensing level, and a controller which decreases an output voltage of a circuit which is protected by the overcurrent protective system and includes the element when the current flowing in the element is determined as the overcurrent.

In an exemplary embodiment, the overcurrent counting unit may select a protection start standard corresponding to the element among a plurality of protection start standards which become standards for determining whether a protection operation for the circuit is to be started on the basis of the number of times that the current flowing in the element becomes the overcurrent.

In an exemplary embodiment, the overcurrent counting unit may count the number of times that the current detected by the current detector becomes equal to or larger than the overcurrent sensing level (that is, the overcurrent occurrence number), and may compare the overcurrent occurrence number with the selected protection start standard.

In an exemplary embodiment, the controller may make an operation of the circuit stop when the overcurrent occurrence number becomes equal to or larger than the selected protection start standard.

In an exemplary embodiment, this system may select an overcurrent counting start point corresponding to the element among a plurality of overcurrent counting start points, and may count the number of times that the current detected by the current detector becomes equal to or larger than the overcurrent sensing level from the selected overcurrent counting start point.

In an exemplary embodiment, the controller may monitor variation in the output voltage of the circuit when the output voltage starts to decease, may compare the changed output voltage with the a predetermined overload sensing level that becomes a standard for determining whether a protection operation for the circuit is to be performed, and may make an operation of the circuit stop when the changed output voltage becomes lower than the predetermined overload sensing level.

In an exemplary embodiment, the predetermined overload sensing level may be one selected among a plurality of overload sensing levels to correspond to the element to be protected.

In an exemplary embodiment, the controller may make an operation of the circuit stop after a predetermined protection start time has elapsed from a time point at which the output voltage becomes lower than the predetermined overload sensing level.

In an exemplary embodiment, the predetermined protection start time may be one selected among a plurality of protection start times to correspond to the element to be protected.

According to the exemplary embodiment of the invention, an overcurrent protective method may include detecting a current flowing in an element which is to be protected, selecting an overcurrent sensing level corresponding to the element among a plurality of overcurrent sensing levels which are threshold values becoming standards for determining whether the detected current is a normal current or an overcurrent, and determining whether the current is the overcurrent or not by comparing the current with the selected overcurrent sensing level, and decreasing an output voltage of a circuit which is to be protected and includes the element to be protected when the current flowing in the element is determined as the overcurrent.

This method may further include monitoring variation in the output voltage of the circuit when the output voltage starts to decease, comparing the changed output voltage with the a predetermined overload sensing level, and making an operation of the circuit stop when the changed output voltage becomes lower than the predetermined overload sensing level. In this case, the predetermined overload sensing level may be one selected among a plurality of overload sensing levels to correspond to the element which is to be protected.

In this method, the operation of the circuit may be controlled to stop after a predetermined protection start time has elapsed from a time point at which the output voltage becomes lower than the predetermined overload sensing level, and the predetermined protection start time may be one selected among a plurality of protection start times to correspond to the element which is to be protected.

In this method, at least one of the overcurrent sensing level, the predetermined overload sensing level and the predetermined protection start time, all of which correspond to the element to be protected, may be selected on the basis of at least one of a maximum allowable current, a maximum allowable voltage and a maximum allowable power corresponding to the element.

The method may further include selecting a protection start standard corresponding to the element to be protected among a plurality of protection start standards which become standards for determining whether an protection operation for the circuit is to be started on the basis of the number of times that the current flowing in the element becomes the overcurrent, counting the number of times that the detected current becomes equal to or larger than the overcurrent sensing level (that is, the overcurrent occurrence number) and comparing the overcurrent occurrence number with the selected protection start standard, and making an operation of the circuit stop when the overcurrent occurrence number becomes equal to or larger than the selected protection start standard.

In an exemplary embodiment, the protection start standard corresponding to the element to be protected may be selected on the basis of at least one of a maximum allowable current, a maximum allowable voltage and a maximum allowable power corresponding to the element.

According to the invention, a protection operation may be appropriately performed for the element which is to be protected against the overcurrent by controlling the overcurrent sensing level, the protection start standard, the overcurrent counting start point, the overload sensing level, and the protection start time depending on the type and properties of the element.

According to the invention, it is possible to prevent the circuit from being damaged due to intermittently occurring overcurrent.

According to the invention, it is also possible to prevent the overcurrent protective system from sensitively reacting to a surge of overcurrent, such as electrostatic discharge or electrical overstress.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

The advantages and features of the invention and the methods for accomplishing the same will be apparent from the exemplary embodiments described hereinafter with reference to the accompanying drawings. The exemplary embodiments described herein are provided to allow a skilled person in the art to easily understand the idea of the invention, and the invention is not meant to be limited thereto. The exemplary embodiments described herein may be modified within the technical idea and scope of the invention. The scope of the invention is to be determined by reasonable interpretation of the claims, and all alterations within equivalences of the invention fall within the scope of the invention. Like reference numerals designate like elements throughout the specification.

The invention will be described more fully hereinafter with reference to the accompanying drawings, in which exemplary embodiment of the invention are shown.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1:
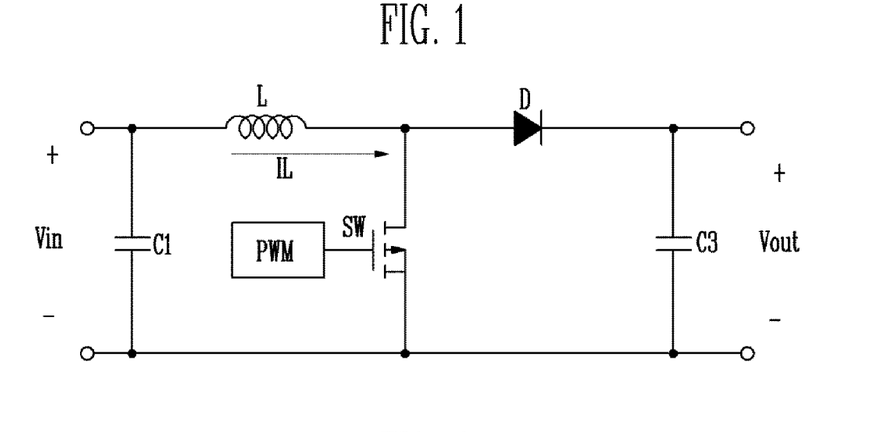
FIG. 1 is a circuit view showing a structure of a power supply circuit provided in an electronic device.

FIG. 1 is a circuit view showing a structure of a power supply circuit provided in an electronic device.

Referring to FIG. 1, the power supply circuit may include an inductor L, a switch SW, a diode D, and capacitors C1 and C3. Voltages of both terminals of the capacitor C1 may be input voltages of the power supply circuit, while voltages of both terminals of the capacitor C3 may be output voltages of the power supply circuit.

The switch SW may be a semiconductor element such as a metal oxide silicon field effect transistor ("MOSFET") or the like. The switch SW may be supplied with a pulse width modulation ("PWM") signal, turning on or off in response to the PWM signal.

The power supply circuit is a direct current to direct current ("DC-DC") converter which may obtain a direct current output voltage from a direct current input voltage. In particular, the power supply circuit may be a booster circuit that is commonly used when the output voltage having a higher value than the input voltage is needed.

Figure 2:
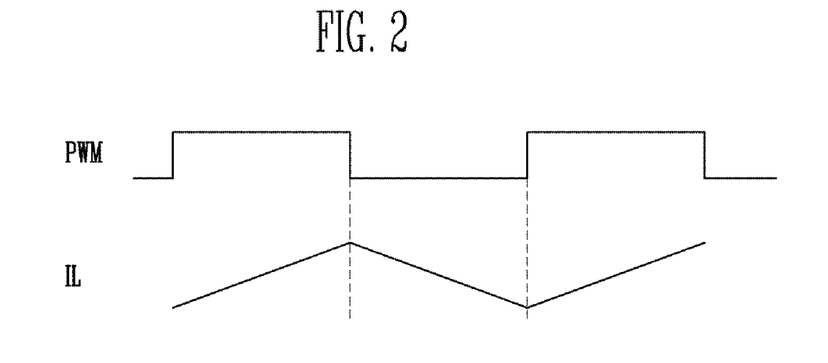
FIG. 2 shows waveforms for describing a driving method of the power supply circuit shown in FIG. 1.

FIG. 2 shows waveforms for describing a driving method of the power supply circuit shown in FIG. 1. In this figure, the upper is a waveform of the PWM signal, and the lower is a graph showing variation of a current IL flowing in the inductor of FIG. 1.

First, when the switch SW is turned on in response to the PWM signal shown in FIG. 2, the current does not flow toward the capacitor C3 to which a reverse bias is applied, and thus the inductor L charges energy.

As the energy is continually charged in the inductor L during the switch SW maintains a turning-on state, the current IL flowing in the inductor L may increase, having a predetermined positive slope value as shown in the graph of FIG. 2.

When an input voltage is Vin and an inductance value of the inductor L is L0, the predetermined positive slope value may be represented by Vin/L0.

Next, when the switch SW is turned off, the charged energy is discharged toward the output after passing through the diode D.

In this case, as the charged energy in the inductor L is continuously discharged during the switch SW maintains a turning-off state, the current IL flowing in the inductor L may decrease, having a predetermined negative slope value as shown in the graph of FIG. 2.

When the output voltage is Vout, the predetermined negative slope value may be represented by $\{(Vin-Vout)/L0\}$.

In this case, the output voltage Vout may be determined by a duty ratio of the PWM signal. In an exemplary embodiment, the output voltage Vout may increase as the duty ratio becomes closer to 1, for example.

When an overcurrent flows into any element comprising the power supply circuit shown in FIG. 1, overload and unwanted heat due to the overload occur, and thus not only the element with the overcurrent but also the circuit with such an element and even the electronic device may be damaged.

Accordingly, a system for protecting the circuit and/or the device from the overcurrent may be provided in the device. This system shuts off an operation of the power supply circuit when it detects that the overcurrent flows in the circuit, thereby performing protection for the circuit against the overcurrent.

In an exemplary embodiment, the overcurrent protective system may stop a power supply for the power supply circuit so that the input voltage Vin becomes 0, or may turn off the switch SW to stop the operation of the power supply circuit, for example.

On the assumption that an excessive current flows in the inductor L of the power supply circuit of FIG. 1, a structure and functions of the overcurrent protective system will be described below.

Even though not shown in FIG. 1, a current sensor may be further provided in the power supply circuit so as to measure the current IL flowing in the inductor L.

In addition, even though not shown in FIG. 1, a voltage sensor may be further provided in the power supply circuit so as to measure the output voltage Vout.

The inner structure and functions of the overcurrent protective system are described in detail with reference to FIG. 3.

Figure 3:
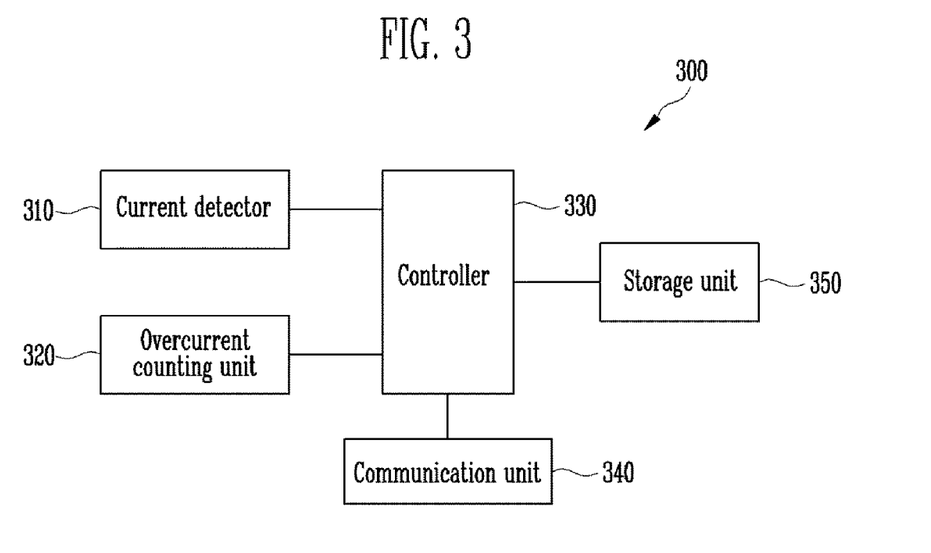
FIG. 3 is a schematic view for describing an exemplary embodiment of an inner structure of an overcurrent protective system according to the invention.

FIG. 3 is a schematic view for describing the inner structure of the overcurrent protective system according to an exemplary embodiment of the invention.

Referring to FIG. 3, the overcurrent protective system 300 according to the exemplary embodiment of the invention may include a current detector 310, an overcurrent counting unit 320, a controller 330, a communication unit 340, and a storage unit 350.

The current detector 310 may obtain information about a value of the current IL flowing in the power supply circuit from any one selected from a group including a hall sensor, a shunt resistor, and equivalents thereof.

The overcurrent counting unit 320 may determine whether the overcurrent flows in the inductor L based on the information about the value of the current IL given by the current detector 310.

In addition, whenever the value of the current IL (refer to FIGS. 1 and 2) given by the current detector 310 is determined to correspond to an excessive current, the overcurrent counting unit 320 may count the overcurrent occurrence number in the inductor L (refer to FIG. 1).

When determining that the inductor L and/or the power supply circuit is to be protected against the overcurrent, the overcurrent counting unit 320 may supply a protection starting signal to the controller 330.

Further detailed functions of the overcurrent counting unit 320 will be described later with reference to FIGS. 4 to 8.

Next, the controller 330 may control an operation of the power supply circuit so as to enable the protection for the circuit to be normally performed when the protection starting signal is applied from the overcurrent counting unit 320. In an exemplary embodiment, the controller 330 may stop (shut down) the operation of the power supply circuit in response to the protection starting signal, for example.

In addition, the controller 330 may control a flow of data in the power supply circuit in which the current detector 310, the overcurrent counting unit 320, the communication unit 340, and the storage unit 350 are included. In detail, the controller 330 controls a flow of data inputted from or outputted to the outside of the overcurrent protective system 300, or a flow of data between the respective elements of the overcurrent protective system 300, thereby enabling the current detector 310, the overcurrent counting unit 320, the communication unit 340, and the storage unit 350 to normally perform their native functions.

Next, the communication unit 340 may enable the overcurrent protective system 300 to be interfaced with the outside. In addition, the communication unit 340 may also enable the overcurrent protective system 300 to be interfaced with a circuit (for example, the power supply circuit) or an electronic device, which is a target to be protected from the overcurrent.

In detail, a standard of determination for the overcurrent may vary depending on what a target is to be protected from the overcurrent is, and the standard may be applied to the target through a specific communication.

Therefore, when the overcurrent counting unit 320 determines whether an overcurrent protection operation is to be performed, different standards may be applied according to the type and properties of a specific element, a circuit with the element, or an electronic device with the circuit.

In an exemplary embodiment, when the overcurrent counting unit 320 determines whether the current flowing in the inductor L embedded in the power supply circuit of FIG. 1 is overcurrent or not, the communication unit 340 may be supplied with information about the overcurrent determination standard corresponding to the inductor L, for example.

In this case, the communication unit 340 receives only the information about the overcurrent determination standard, but it may further receive additional information.

In an exemplary embodiment, the communication unit 340 may receive information about the type and properties of a specific element, a circuit with the element, or an electronic device with the circuit, for example.

In this case, the overcurrent counting unit 320 may select the information about the overcurrent determination standard on the basis of the information about the type and properties of a specific element, a circuit with the element, or an electronic device with the circuit.

The communication unit 340 may interface with the outside through an inter integrated circuit ("I2C") communication. Here, the I2C communication is an easily understood technique by a person of ordinary skill in the art to which the invention pertains, so detailed description thereof is omitted.

Lastly, the storage unit 350 may store information about properties of a specific element. In an exemplary embodiment, information about inductance, capacitance, and resistance may be stored in the storage unit 350, for example. In addition, information about a maximum allowable current value or a maximum allowable power value may be further stored in the storage unit 350.

In addition, the storage unit 350 may store the information about the overcurrent determination standard.

In an exemplary embodiment, such a storage unit 350 may be a read only memory ("ROM"), an electrically erasable programmable read-only memory ("EEPROM"), a flash memory, or an equivalent memory element thereof, for example, but the invention is not limited thereto.

The current detector 310, the overcurrent counting unit 320, the controller 330, the communication unit 340, and the storage unit 350 are respectively illustrated as separate elements in FIG. 3, but some of them may be integrated.

Hereinafter, overcurrent protection ("OCP") methods will be described with reference to FIGS. 4 to 8. For ease of description, on the assumption that a protection operation is performed when overcurrent occurs in the power supply circuit, the methods will be described.

Figure 4:
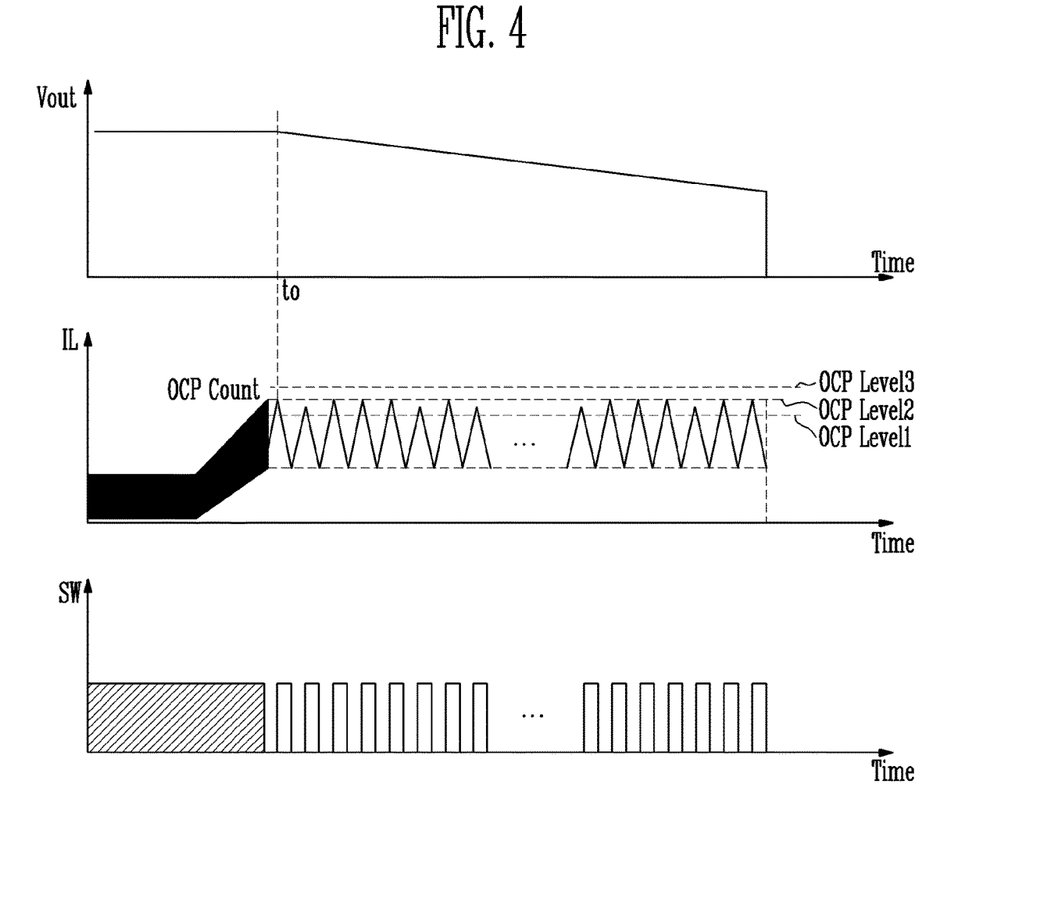
FIG. 4 shows waveforms for the exemplary embodiment of an output voltage of FIG. 1, a current flowing in an inductor of FIG. 1, and operations of a switch of FIG. 1, which are graphs for describing an overcurrent protection method according to the invention.

FIG. 4 shows waveforms for the output voltage value Vout of FIG. 1, the current IL flowing in the inductor of FIG. 1, and operations of the switch SW of FIG. 1, which are graphs for describing an overcurrent protection method according to the exemplary embodiment of the invention.

When it is determined that the current IL flowing in the inductor L becomes an overcurrent from a time point t0 as shown in FIG. 4, the output voltage Vout is gradually deceased from the time point t0 by controlling the switch SW.

According to the exemplary embodiment of FIG. 4 of the invention, a plurality of overcurrent sensing levels may be prepared for this purpose.

The overcurrent sensing levels may become the standards for determining whether the current IL is normal or excessive.

In detail, when a measured value of the current IL is less than the overcurrent sensing level, it may be determined that the current IL is a normal current. Contrastively, when the measured value is equal to or larger than the overcurrent sensing level, it may be determined that the current IL is an overcurrent.

The storage unit 350 (refer to FIG. 3) may store information as shown in Table 1. Table 1 shows the overcurrent sensing levels corresponding to respective options.

TABLE 1

| Option (code) | 0000 | 0001 | 0010 | 0011 | ... |
|---|---|---|---|---|---|
| Overcurrent sensing level (A) | 0.5 | 1.0 | 1.5 | 2.0 | ... |

A dotted line corresponding to OCP level 1 of FIG. 4 may be an overcurrent sending level corresponding to the code number 0000 of Table 1, and a dotted line corresponding to OCP level 2 of FIG. 4 is an overcurrent sending level corresponding to the code number 0001 of Table 1. A dotted line corresponding to OCP level 3 of FIG. 4 may be an overcurrent sending level corresponding to the code number 0010 of Table 1.

The overcurrent counting unit 320 (refer to FIG. 3) may select the code number corresponding to the element which is a target to be protected against the overcurrent. Then, the overcurrent counting unit 320 may determine whether a current flowing in the element is an overcurrent on the basis of the overcurrent sensing level corresponding to the selected code number.

In an exemplary embodiment, in the case in which the code number of 0001 is set to correspond to properties of the inductor L shown in FIG. 1, the overcurrent counting unit 320 may determine whether the current IL flowing in the inductor L is a regular current or an overcurrent on the basis of the overcurrent sensing level of 1 ampere (A) corresponding to the code number of 0001, for example.

When the current IL becomes an overcurrent that is equal to or greater than 1 A, the controller 330 (refer to FIG. 3) may decrease the output voltage Vout by controlling the switch SW.

In addition, when the output voltage Vout becomes equal to or lower than a predetermined overload sensing level, the controller 330 may shut off operation of the power supply circuit after a predetermined time has elapsed from a time point at which the output voltage Vout becomes equal to or lower than the predetermined overload sensing level.

Figure 5:
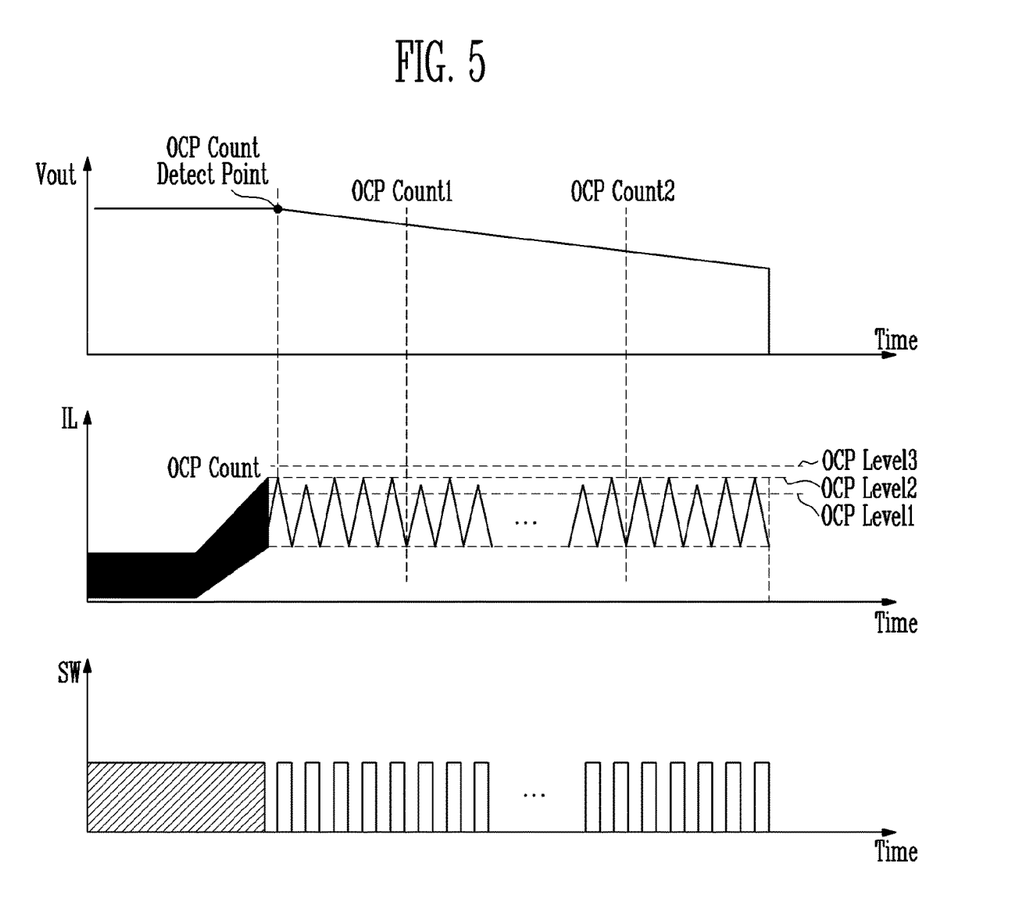
FIG. 5 shows graphs for describing another exemplary embodiment of overcurrent protection method according to the invention.

FIG. 5 shows graphs for describing another overcurrent protection method according to another exemplary embodiment of the invention. When the exemplary embodiment is described, duplicated parts with the previous embodiment are omitted, and parts different from the previous embodiment are mainly described below.

Referring to FIG. 5, whenever the switch SW (refer to FIG. 1) repeats on/off operations, the current IL flowing in the inductor L may repeat increase and decrease similarly to an alternating current.

The current detector 310 obtains values of the current IL flowing in the inductor L whenever the switch SW repeats the on/off operations, and the overcurrent counting unit 320 determines whether each peak value of the current IL is equal to or larger than the overcurrent sensing level whenever the current IL flowing in the inductor L repeats increase and decrease. In the description for the exemplary embodiment, it is assumed that the overcurrent sensing level corresponds to OCP Level 2 of FIG. 5.

The overcurrent counting unit 320 counts the number of times that the current IL becomes equal to or larger than the overcurrent sensing level, and then when the counted number becomes equal to or larger than a predetermined number, it enables a predetermined protection for the corresponding circuit to be performed.

According to the exemplary embodiment of the invention, a plurality of overcurrent occurrence number levels may be prepared, which become standards for determining whether a protection operation for the power supply circuit is to be performed.

In an exemplary embodiment, the overcurrent occurrence number level for an element which is sensitive to the overcurrent may be set to be relatively small, while it may be large set for an element which is relatively insensitive to the overcurrent and does not require a minute control, for example.

The storage unit 350 may store information as shown in Table 2. Table 2 shows the overcurrent occurrence number levels corresponding to respective options.

TABLE 2

| Option (code) | 0000 | 0001 | 0010 | 0011 | ... |
|---|---|---|---|---|---|
| Overcurrent accumulation number level | 4 | 16 | 64 | 256 | ... |

A dotted line corresponding to OCP count 1 of FIG. 5 may be a time point at which the protection operation for the power supply circuit is started when the code number of 0000 is applied, and a dotted line corresponding to OCP count 2 of FIG. 5 may be a time point at which the protection operation for the power supply circuit is started when the code number of 0001 is applied.

In detail, in the case of the code number of 0000, the protection operation may be performed when the current IL becomes equal to or larger than the overcurrent sensing level four times from an OCP count detect point (of FIG. 5) at which the current IL becomes equal to or larger than the overcurrent sensing level for the first time. In this case, the protection operation for the power supply circuit is performed after a predetermined time has elapsed from a time point at which the overcurrent occurrence number becomes four. That is, the protection operation may be performed from a time point corresponding to OCP Count 1 shown in FIG. 5. However, the invention is not necessarily limited thereto. In an exemplary embodiment, the protection operation may be promptly performed at the time point at which the overcurrent occurrence number becomes four, for example.

In addition, in the case of the code number of 0001, the protection operation may be performed when the current IL becomes equal to or larger than the overcurrent sensing level sixteen times from the OCP count detect point at which the current IL becomes equal to or larger than the overcurrent sensing level for the first time. In this case, the protection operation for the power supply circuit is performed after a predetermined time has elapsed from a time point at which the overcurrent occurrence number becomes sixteen. That is, the protection operation may be performed from a time point corresponding to OCP Count 2 shown in FIG. 5. However, the invention is not necessarily limited thereto. In an exemplary embodiment, the protection operation may be promptly performed at the time point at which overcurrent occurrence number becomes sixteen, for example.

Here, the overcurrent sensing level may be selected among OCP Level 1 to OCP Level 3 and the time point at which the protection operation for the power supply circuit is started may vary depending on the code number.

The overcurrent counting unit 320 selects the code number corresponding to the element which is a target to be protected from the overcurrent from Table 2, and enables the protection operation for the power supply circuit to be performed on the basis of the overcurrent occurrence number level.

In an exemplary embodiment, in the case in which the code number of 0001 is set to be appropriate for properties of the inductor L of FIG. 1, the overcurrent counting unit 320 enables the protection operation to be started on the basis of a time point at which the current IL becomes equal to or larger than the overcurrent sensing level sixteen times, for example.

In detail, the overcurrent counting unit 320 may shut off the operation of the power supply circuit simultaneously with the time point at which the current IL becomes equal to or larger than the overcurrent sensing level sixteen times, or after a predetermined time from that time point.

Figure 6:
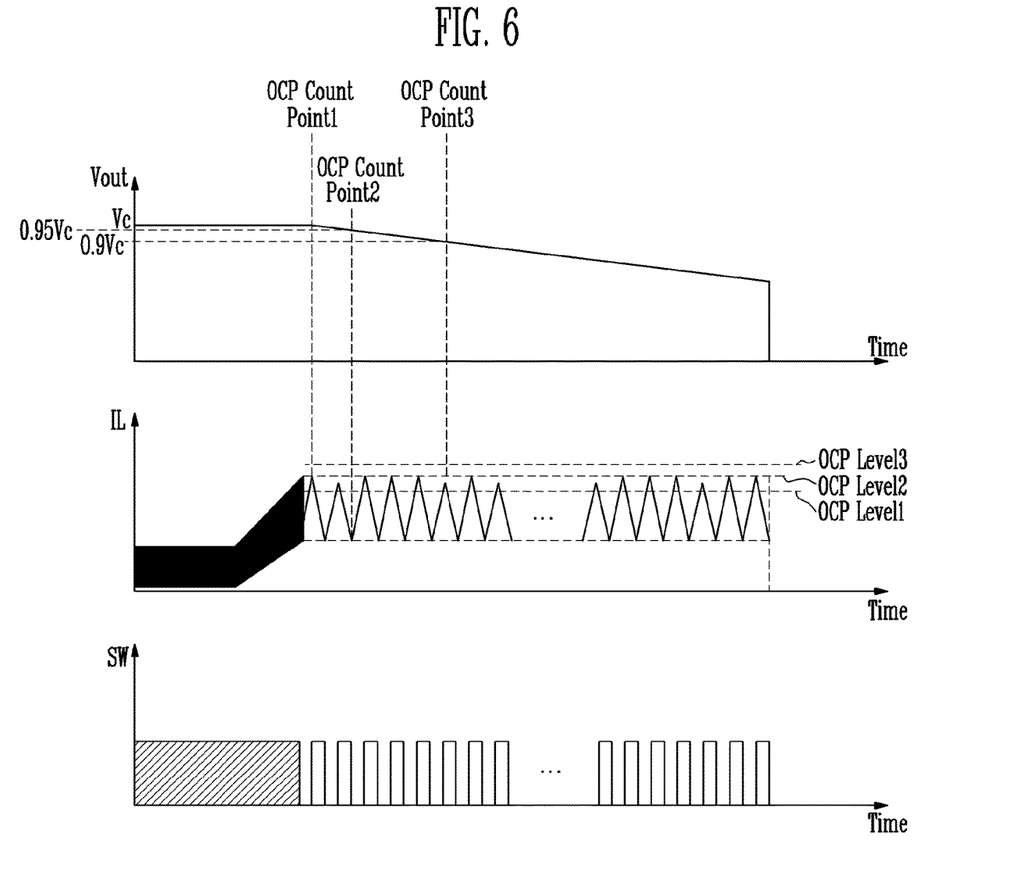
FIG. 6 shows graphs for describing another exemplary embodiment of overcurrent protection method according to the invention.

FIG. 6 shows graphs for describing another overcurrent protection method according to another exemplary embodiment of the invention. When the exemplary embodiment is described, duplicated parts with the previous embodiments are omitted, and parts different from the previous embodiments are mainly described below.

In the exemplary embodiment of FIG. 5, the protection operation is started when the number counted whenever the current IL flowing in the inductor L becomes equal to or larger than the overcurrent sensing level reaches the predetermined overcurrent occurrence number level. The number counting is started from the time point (OCP count detect point of FIG. 5) at which the current IL becomes equal to or larger than the overcurrent sensing level for the first time, but the invention is not necessarily limited thereto.

That is, as described with FIG. 5, the protection operation may be performed depending on the overcurrent occurrence number level, and the overcurrent counting start point at which a count for the overcurrent occurrence number is started may be variously set.

In detail, when an output voltage of a time point at which the output voltage Vout starts decreasing due to the current IL equal to or larger than the overcurrent sensing level is Vc, the time point at which the output voltage Vout starts decreasing may be set to be the overcurrent counting start point, which is OCP count point 1 of FIG. 6. Differently, a time point at which the output voltage Vout decreases to 0.95 Vc may be set to be the overcurrent counting start point, which is OCP count point 2 of FIG. 6. Differently, a time point at which the output voltage Vout decreases to 0.9 Vc may be set to be the overcurrent counting start point, which is OCP count point 3 of FIG. 6.

In an exemplary embodiment, as the element is sensitive to the overcurrent, the overcurrent counting start point may be set to be further earlier so that the protection operation for the circuit may be promptly performed, for example.

The storage unit 350 may store information as shown in Table 3. Table 3 shows the overcurrent counting start points corresponding to respective options.

TABLE 3

| Option (code) | 0000 | 0001 | 0010 | 0011 | ... |
|---|---|---|---|---|---|
| Overcurrent counting start point | Vc | 0.95 Vc | 0.9 Vc | 0.85 Vc | ... |

The overcurrent counting unit 320 selects the code number corresponding to the element which is a target to be protected against the overcurrent from Table 3, and enables the protection operation for the circuit to be performed by counting the number of times that the peak value of the current IL becomes equal to or larger than the overcurrent sensing level from the overcurrent counting start point corresponding to the selected code number.

Figure 7:
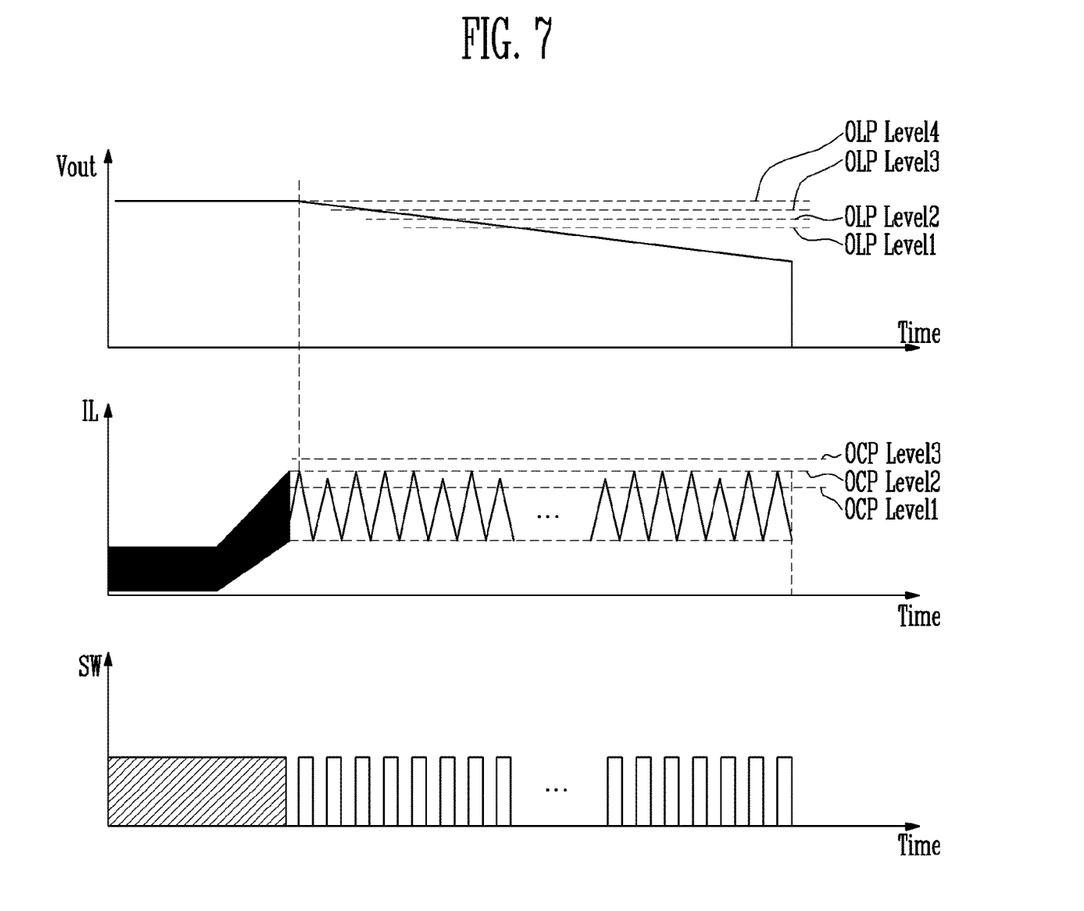
FIG. 7 shows graphs for describing another exemplary embodiment of overcurrent protection method according to the invention.

Next, FIG. 7 shows graphs for describing another overcurrent protection method according to another exemplary embodiment of the invention. When the exemplary embodiment is described, duplicated parts with the previous embodiments are omitted, and parts different from the previous embodiments are mainly described below.

When the inductor L is regarded as being in an overload state due to the overcurrent flowing thereinto, the protection operation for the power supply circuit may be performed. In this case, for example, the operation of the circuit may be shut off.

In particular, when it is determined that the current IL is an overcurrent equal to or larger than the overcurrent sensing level, the controller 330 controls the switch SW so that the output voltage Vout is deceased, and monitors whether the output voltage Vout becomes equal to or lower than a predetermined overload sensing level.

The overload sensing level is a level which becomes the standard of a time point at which the protection operation for the power supply circuit is started. That is, when the output voltage Vout becomes equal to or lower than the predetermined overload sensing level, the protection operation may be performed.

The protection operation for the power supply circuit may be promptly performed when the output voltage Vout becomes equal to or lower than the predetermined overload sensing level, but the invention is not necessarily limited thereto. In an exemplary embodiment, the protection operation for the power supply circuit may be performed after a predetermined time from a time point at which the output voltage Vout becomes equal to or lower than the predetermined overload sensing level, for example.

According to the exemplary embodiment of the invention, a plurality of overload sensing levels may be prepared for this purpose.

The storage unit 350 may store information as shown in Table 4. Table 4 shows the overload sensing levels corresponding to respective options.

TABLE 4

| Option (code) | 0000 | 0001 | 0010 | 0011 | ... |
|---|---|---|---|---|---|
| Overload sensing level (V) | 0.95 Vc | 0.85 Vc | 0.75 Vc | 0.65 Vc | ... |

Referring to Table 4, when a value of the output voltage at a time point at which the output voltage Vout starts decreasing due to the current IL equal to greater than the overload sensing level is Vc, the overload sensing level (OLP level 4 of FIG. 7) corresponding to the code number of 0000 is 0.95 Vc, the overload sensing level (OLP level 3 of FIG. 7) corresponding to the code number of 0001 is 0.85 Vc, the overload sensing level (OLP level 2 of FIG. 7) corresponding to the code number of 0010 is 0.75 Vc, and the overload sensing level (OLP level 1 of FIG. 7) corresponding to the code number of 0011 is 0.65 Vc.

The controller 330 selects the code number corresponding to the element which is a target to be protected against the overcurrent from Table 4, and enables the protection operation for the power supply circuit to be performed on the basis of the overload sensing level corresponding to the selected code number.

In an exemplary embodiment, in the case in which the code number of 0001 is set to be appropriate for properties of the inductor L of FIG. 1, the protection operation for the power supply circuit may be performed when the output voltage Vout becomes 0.85 Vc from a time point at which the output voltage Vout starts decreasing, for example.

Figure 8:
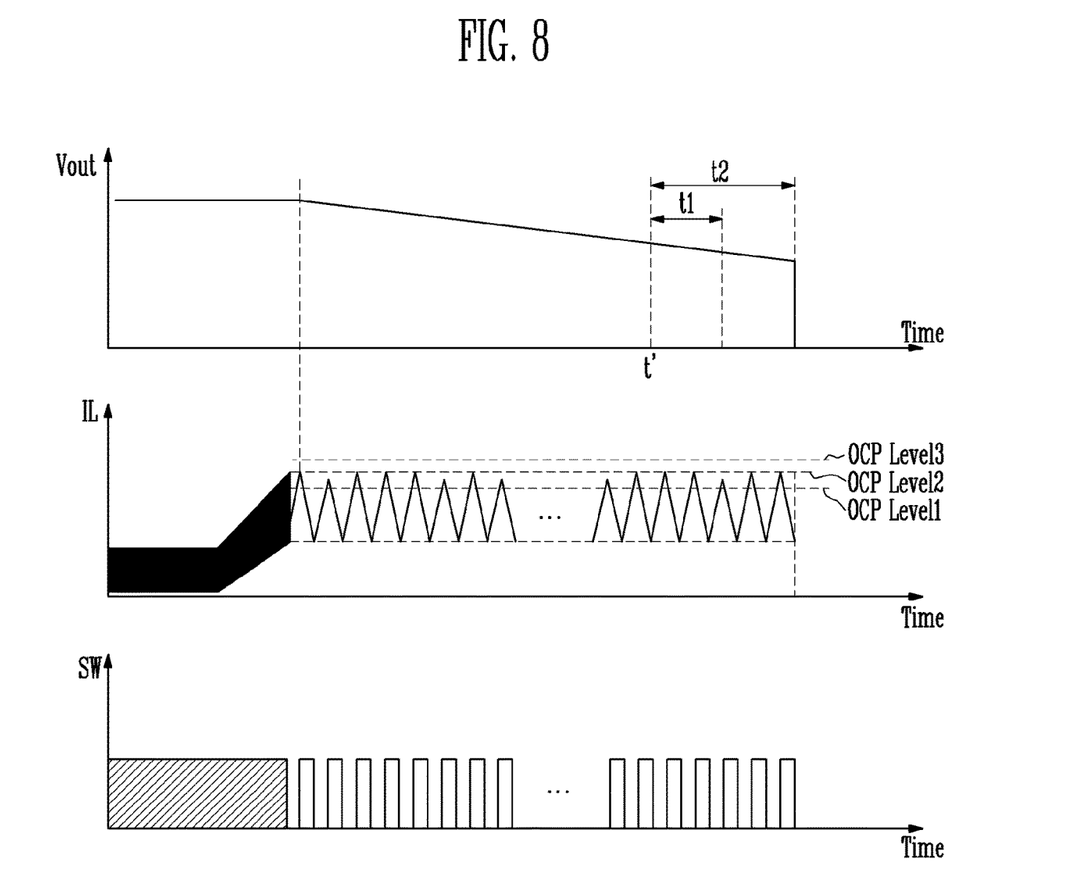
FIG. 8 shows graphs for describing another exemplary embodiment of overcurrent protection method according to the invention.

FIG. 8 shows graphs for describing another overcurrent protection method according to another exemplary embodiment of the invention. When the exemplary embodiment is described, duplicated parts with the previous embodiments are omitted, and parts different from the previous embodiments are mainly described below.

As described above, the output voltage Vout is gradually decreased when the current IL is determined as the overcurrent, and when the decreased output voltage Vout reaches the predetermined overload sensing level, the protection operation for the circuit may be performed after a predetermined time from a time point at which the decreased output voltage Vout reaches the predetermined overload sensing level.

According to exemplary embodiment of the invention, a plurality of protection start points may be prepared for this purpose, and the storage unit 350 may store information as shown in Table 5. Table 5 shows the protection start points corresponding to the respective options.

TABLE 5

| Option (code) | 0000 | 0001 | 0010 | 0011 | ... |
|---|---|---|---|---|---|
| Protection start point (ms) | 1.5 | 2.0 | 2.5 | 3.0 | ... |

Referring to Table 5, in the case in which the element that is a target to be protected against the overcurrent corresponds to the code number of 0000, the protection operation may be performed after 1.5 milliseconds (ms) from the time point at which the output voltage Vout reaches the predetermined overload sensing level, and in the case in which the element corresponds to the code number of 0001, the protection operation may be performed after 2.0 ms from the time point at which the output voltage Vout reaches the predetermined overload sensing level.

Accordingly, referring to FIG. 8, when the selected code number is 0000, the operation of the power supply circuit may be shut off after 1.5 ms (which corresponds to a period t1 of FIG. 8) from a time point t'. In addition, when the selected code number is 0001, the operation of the power supply circuit may be shut off after 2.0 ms (a period t2 of FIG. 8) from the time point t'. In the exemplary embodiment, the time point t' may be a time point at which the number of times that the overcurrent occurs reaches the overcurrent occurrence number level, and in the exemplary embodiment it may be a time point at which the output voltage Vout reaches the predetermined overload sensing level.

In this embodiment, the controller 330 selects the code number corresponding to the element which is a target to be protected against the overcurrent, and enables the protection operation for the circuit to be performed on the basis of the protection start point corresponding to the selected code number.

The invention is not limited to numeral values of Table 1 to Table 5, so those values may be modified.

In addition, the overcurrent protective system applied to the power supply circuit of FIG. 1 is described in the exemplary embodiments of FIGS. 4 to 8 for ease of description. However, the overcurrent protective system according to the invention may be applicable to various circuits.

The overcurrent protective system of the invention may operate according to any one of the exemplary embodiments of FIGS. 4 to 8 or by combining two or more embodiments of them.

In an exemplary embodiment, the overcurrent sensing level according to the exemplary embodiment of FIG. 4 may be set on the basis of properties of the element which is a target to be protected against the overcurrent, for example.

Then, in the case in which the protection operation is performed on the basis of the overcurrent occurrence number level, the overcurrent counting start point according to the exemplary embodiment of FIG. 6 may be selected on the basis of the properties of the element which is a target to be protected against the overcurrent. In this case, the number counting is performed whenever the current IL becomes equal to or larger than the overcurrent sensing level from the selected overcurrent counting start point, and the protection operation for the circuit may be performed when the counted number reaches the overcurrent occurrence number level.

In addition, the protection start point according to the exemplary embodiment of FIG. 8 may be further selected on the basis of the properties of the element which is a target to be protected against the overcurrent. In this case, the protection operation for the circuit may be performed after the additionally selected protection start point has elapsed from a time point at which the counted number reaches the selected overcurrent occurrence number level.

Differently, first, the overcurrent sensing level according to the exemplary embodiment of FIG. 4 may be selected on the basis of the properties of the element which is a target to be protected against the overcurrent.

Next, in the case in which the protection operation may be started on the basis of the magnitude of output voltage, the overload sensing level according to the exemplary embodiment of FIG. 7 may be selected on the basis of the properties of the element which is a target to be protected from the overcurrent.

After the overload sensing level is selected, the protection start point according to the exemplary embodiment of FIG. 8 may be selected on the basis of the properties of the element which is a target to be protected from the overcurrent.

In this case, when it is determined that the overcurrent flows in the element on the basis of the selected overcurrent sensing level, the output voltage is decreased by controlling the switch, and the protection operation for the circuit may be performed after the predetermined time from the time point at which the output voltage reaches the selected overload sensing level.

Exemplary embodiments have been disclosed herein and although specific terms are employed, they are used and are to be interpreted in a generic and descriptive sense only and not for purpose of limitation. In some examples, as would be apparent to one of ordinary skill in the art as of the filing of the application, features, characteristics and/or elements described in connection with a particular embodiment may be used singly or in combination with features, characteristics and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. An overcurrent protective system comprising:
   a current detector which detects a current flowing in an element which is to be protected by the overcurrent protective system; and
   a controller which selects an overcurrent sensing level corresponding to the element among a plurality of overcurrent sensing levels which are threshold values becoming standards for determining whether the current detected by the current detector is a normal current or an overcurrent and which determines whether the current is the overcurrent or not by comparing the current with the selected overcurrent sensing level, wherein, in a period, the controller decreases an output voltage of a circuit which is protected by the overcurrent protective system and includes the element when the current flowing in the element is determined as the overcurrent, wherein, in the period, the controller decreases the output voltage from a first output voltage to a second output voltage, wherein the first and second output voltages are both greater than zero, and wherein the current flowing in the elements is repeatedly increased and decreased during the period.

2. The overcurrent protective system of claim 1, wherein the controller selects a protection start standard corresponding to the element among a plurality of protection start standards which become standards for determining whether a protection operation for the circuit is to be started on the basis of a number of times which the current flowing in the element becomes the overcurrent.

3. The overcurrent protective system of claim 2, wherein the controller counts the number of times which the current detected by the current detector becomes equal to or larger than the overcurrent sensing level, and compares the overcurrent occurrence number with the selected protection start standard.

4. The overcurrent protective system of claim 3, wherein the controller makes an operation of the circuit stop when the overcurrent occurrence number becomes equal to or larger than the selected protection start standard.

5. The overcurrent protective system of claim 3, wherein the overcurrent protective system selects an overcurrent counting start point corresponding to the element among a plurality of overcurrent counting start points, and counts the number of times which the current detected by the current detector becomes equal to or larger than the overcurrent sensing level from the selected overcurrent counting start point.

6. The overcurrent protective system of claim 1, wherein the controller monitors variation in the output voltage of the circuit when the output voltage starts to decrease, compares the changed output voltage with a predetermined overload sensing level which becomes a standard for determining whether a protection operation for the circuit is to be performed, and makes an operation of the circuit stop when the changed output voltage becomes lower than the predetermined overload sensing level.

7. The overcurrent protective system of claim 6, wherein the predetermined overload sensing level is one selected among a plurality of overload sensing levels to correspond to the element to be protected.

8. The overcurrent protective system of claim 6, wherein the controller makes an operation of the circuit stop after a predetermined protection start time has elapsed from a time point at which the output voltage becomes lower than the predetermined overload sensing level.

9. The overcurrent protective system of claim 8, wherein the predetermined protection start time is one selected among a plurality of protection start times to correspond to the element to be protected.

10. An overcurrent protective method, the method comprising:

detecting a current flowing in an element which is to be protected;

selecting an overcurrent sensing level corresponding to the element among a plurality of overcurrent sensing levels which are threshold values becoming standards for determining whether the detected current is a normal current or an overcurrent, and determining whether the current is the overcurrent or not by comparing the current with the selected overcurrent sensing level; and decreasing, in a period, an output voltage of a circuit which is to be protected and includes the element to be protected when the current flowing in the element is determined as the overcurrent, wherein the output voltage is decreased from a first output voltage to a second output voltage in the period, wherein the first and second output voltages are both greater than zero, and wherein the current flowing in the element is repeatedly increased and decreased during the period.

11. The method of claim 10, further comprising monitoring variation in the output voltage of the circuit when the output voltage starts to decrease, comparing the changed output voltage with a predetermined overload sensing level, and making an operation of the circuit stop when the changed output voltage becomes lower than the predetermined overload sensing level, wherein the predetermined overload sensing level is one selected among a plurality of overload sensing levels to correspond to the element which is to be protected.

12. The method of claim 11, wherein the operation of the circuit is controlled to stop after a predetermined protection start time has elapsed from a time point at which the output voltage becomes lower than the predetermined overload sensing level, and wherein the predetermined protection start time is one selected among a plurality of protection start times to correspond to the element which is to be protected.

13. The method of claim 12, wherein at least one of the overcurrent sensing level, the predetermined overload sensing level and the predetermined protection start time, all of which correspond to the element to be protected, is selected on the basis of at least one of a maximum allowable current, a maximum allowable voltage and a maximum allowable power corresponding to the element.

14. The method of claim 10, further comprising:

selecting a protection start standard corresponding to the element to be protected among a plurality of protection start standards which become standards for determining whether an protection operation for the circuit is to be started on the basis of a number of times which the current flowing in the element becomes the overcurrent;

counting the number of times which the detected current becomes equal to or larger than the overcurrent sensing level and comparing the overcurrent occurrence number with the selected protection start standard; and making an operation of the circuit stop when the overcurrent occurrence number becomes equal to or larger than the selected protection start standard.

15. The method of claim 14, wherein the protection start standard corresponding to the element to be protected is selected on the basis of at least one of a maximum allowable current, a maximum allowable voltage and a maximum allowable power corresponding to the element.

* * * * *